US012737543B1

(12) United States Patent
Eng et al.

(10) Patent No.: US 12,737,543 B1
(45) Date of Patent: Sep. 15, 2026

(54) WATERMARKING LARGE LANGUAGE MODEL OUTPUTS

(71) Applicant: Morgan Stanley Services Group Inc., New York, NY (US)

(72) Inventors: Timothy S. Eng, Armonk, NY (US); Pradeep Sundaram, Princeton Junction, NJ (US); Christine J. Tu, Cranbury, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/180,650

(22) Filed: Apr. 16, 2025

(51) Int. Cl.
*G06F 40/279* (2020.01)
*G06F 21/16* (2013.01)

(52) U.S. Cl.
CPC ............ *G06F 40/279* (2020.01); *G06F 21/16* (2013.01)

(58) Field of Classification Search
CPC ............................... G06F 40/279; G06F 21/16
USPC ............................................................. 704/9
See application file for complete search history.

(56) References Cited

U.S. PATENT DOCUMENTS 8,788,507 B1 7/2014 Venugopal et al.
11,893,094 B1 2/2024 Rabie et al.
12,014,440 B1 * 6/2024 Ren ....................... H04L 9/3226
2020/0184212 A1 6/2020 Anthony Samy et al.
2021/0109793 A1 4/2021 Chang et al.
2021/0110009 A1 4/2021 Liu et al.
2021/0149733 A1 5/2021 Cheng et al.
2021/0152600 A1 5/2021 Cheng et al.
2021/0233204 A1 7/2021 Alattar et al.
2021/0240803 A1 8/2021 Michels
2021/0390447 A1 12/2021 Cheruvu et al.
2022/0092157 A1 3/2022 Jalali et al.
2022/0237729 A1 7/2022 Wang et al.
2022/0292623 A1 9/2022 Michiels et al.
2022/0300842 A1 9/2022 Charette et al.
2023/0029578 A1 2/2023 Michiels et al.
2023/0111326 A1 4/2023 Zhan et al.
2023/0145544 A1 5/2023 Sternby et al.
2023/0325497 A1 10/2023 Kumar et al.
2023/0362399 A1 11/2023 Luo et al.
2023/0376577 A1 11/2023 Flother et al.
2023/0394298 A1 12/2023 Rawat et al.
(Continued)

FOREIGN PATENT DOCUMENTS

CN 119598428 A * 3/2025 ............... G06N 5/04

OTHER PUBLICATIONS

Christ et al., "Undetectable Watermarks for Language Models", arXiv:2306.09194v1 [cs.CR], Jun. 16, 2023, pp. 1-32.
(Continued)

*Primary Examiner* — Thierry L Pham
(74) *Attorney, Agent, or Firm* — HUNTON ANDREWS KURTH LLP

(57) ABSTRACT

Systems and methods for implementing a post-hoc, low barrier to entry and low-cost method and system of watermarking large language model (LLM) outputs in an enterprise environment are provided. An embodiment of the present invention is directed to a method and system for embedding a unique invisible watermark into a text output of a large language model to enable traceability and verification of content without perceptibly altering the text, modifying the base LLM, or impacting the computational efficiency of text generation.

18 Claims, 5 Drawing Sheets

(56) References Cited

U.S. PATENT DOCUMENTS

| | | | | |
|---|---|---|---|---|
| 2024/0020788 | A1 | 1/2024 | Luo et al. | |
| 2024/0070238 | A1 | 2/2024 | Golaghazadeh et al. | |
| 2024/0070266 | A1 | 2/2024 | Chai et al. | |
| 2024/0086759 | A1 | 3/2024 | Sharma et al. | |
| 2024/0087075 | A1 | 3/2024 | Luo et al. | |
| 2024/0221763 | A1 | 7/2024 | Ginsburg | |
| 2024/0289910 | A1 | 8/2024 | Wang et al. | |
| 2025/0131928 | A1* | 4/2025 | Drolet | G10L 19/018 |
| 2025/0238634 | A1* | 7/2025 | Goldstein | G06F 40/40 |

OTHER PUBLICATIONS

Gu et al., "On the Learnability of Watermarks for Language Models", Published as a Conference Paper at ICLR 2024, May 2024, pp. 1-23.

Kirschenbauer et al., "A Watermark for Large Language Models", arXiv:2301.10226v4 [cs.LG], May 1, 2024, pp. 1-26.

Kirchenbauer et al., On the Reliability of Watermarks for Large Language Models, Published as a Conference Pper at ICLR 2024, May 2024, pp. 1-45.

Kuditipudi et al., "Robust Distortion-free Watermarks for Language Models", arXiv:2307.15593v3 [cs.LG], Jun. 6, 2023, pp. 1-59.

Sato et al., "Embarrassingly Simple Text Watermarks", arXiv:2310.08920v1 [cs.LG], Oct. 13, 2023, pp. 1-18.

Wang et al., "Source Atribution for Large Language Model-Generated Data", arXiv:2310.00646v2[cs.LG], Sep. 25, 2024, pp. 1-36.

Wang et al., "Towards Codable Watermarking for Injecting Multi-Bits Information to LLMs", Published as a Conference Paper at ICLR 2024, Apr. 3, 2024, pp. 1-27.

* cited by examiner

WATERMARKING LARGE LANGUAGE MODEL OUTPUTS

FIELD OF THE INVENTION

The present invention relates generally to implementing a method and system of generating, applying and verifying watermarks in large language model (LLM) outputs in an enterprise environment.

BACKGROUND

With the rising use of AI models generating text virtually indistinguishable from human-created content, there is an increasing need to trace and verify the origin of such content. Current solutions require significant computational costs and/or modifications to foundational models and text generation itself, which are often unsuitable for a corporate environment that may need to use the models "out-of-the-box."

Furthermore, traditional watermarking methods often alter the content and its quality. This, however, does not lend itself easily in a corporate context due to the significant computational cost and complexities necessary to modify model tokenization, weights and transformers as required by current solutions and similarly for decoding the watermark given a modified response.

Traditional watermarking solutions alter the perceptual quality of the content and introduce significant computational overhead. Most solutions involve watermarking text responses so that the watermarks are not removable and instead fully embedded into the tokens that are generated, which makes it much more complicated to remove the watermark without significantly altering the text itself. Current solutions require alterations to the model itself and further lack any ability to enforce.

Accordingly, there is a need for an improved platform that enables a way to detect, embed and trace watermarks in relation to LLM outputs and AI models.

SUMMARY

Systems and methods for implementing a watermarking service for LLM outputs from AI models are provided. The innovative watermarking service provides verification/confirmation concerning whether certain content is AI generated content or not. The content may include outputs to various LLM or other AI models. Some AI generated content may require specific controls, such as disclaimers, actions, restrictions, governance, compliance as well as other guidelines or enforcements. An embodiment of the present invention assists in identifying, applying and/or enforcing specific controls for certain AI generated content. An embodiment of the present invention provides a non-intrusive watermark service that may be enforced in various downstream applications and processes and further provides an audit service with detailed lineage and metrics.

According to an embodiment, a system for watermarking large language model outputs comprises: a computer server comprising one or more processors; an intermediary that is in communication with a watermarking service; and non-transitory memory comprising instructions that, when executed by the one or more processors, cause the one or more processors to: receive, at the intermediary, a large language model (LLM) request from an application to a model service; encode, at the watermarking service, a unique identifier to generate a watermark that uniquely identifies the large language model request; input, at the model service, the large language model request; receive, from the model service, a text output responsive to the large language model request; and embed the watermark in the text output according to a format, wherein the watermark is traceable and verifiable through the watermarking service.

According to another embodiment, a computer-implemented method comprises the steps of: receiving, at an intermediary, a large language model (LLM) request from an application to a model service, wherein the intermediary is in communication with a watermarking service; encoding, at the watermarking service, a unique identifier to generate a watermark that uniquely identifies the large language model request; inputting, at the model service, the large language model request; receiving, from the model service, a text output responsive to the large language model request; and embedding the watermark in the text output according to a format, wherein the watermark is traceable and verifiable through the watermarking service.

These and other advantages will be described more fully in the following detailed description.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Figure 1:
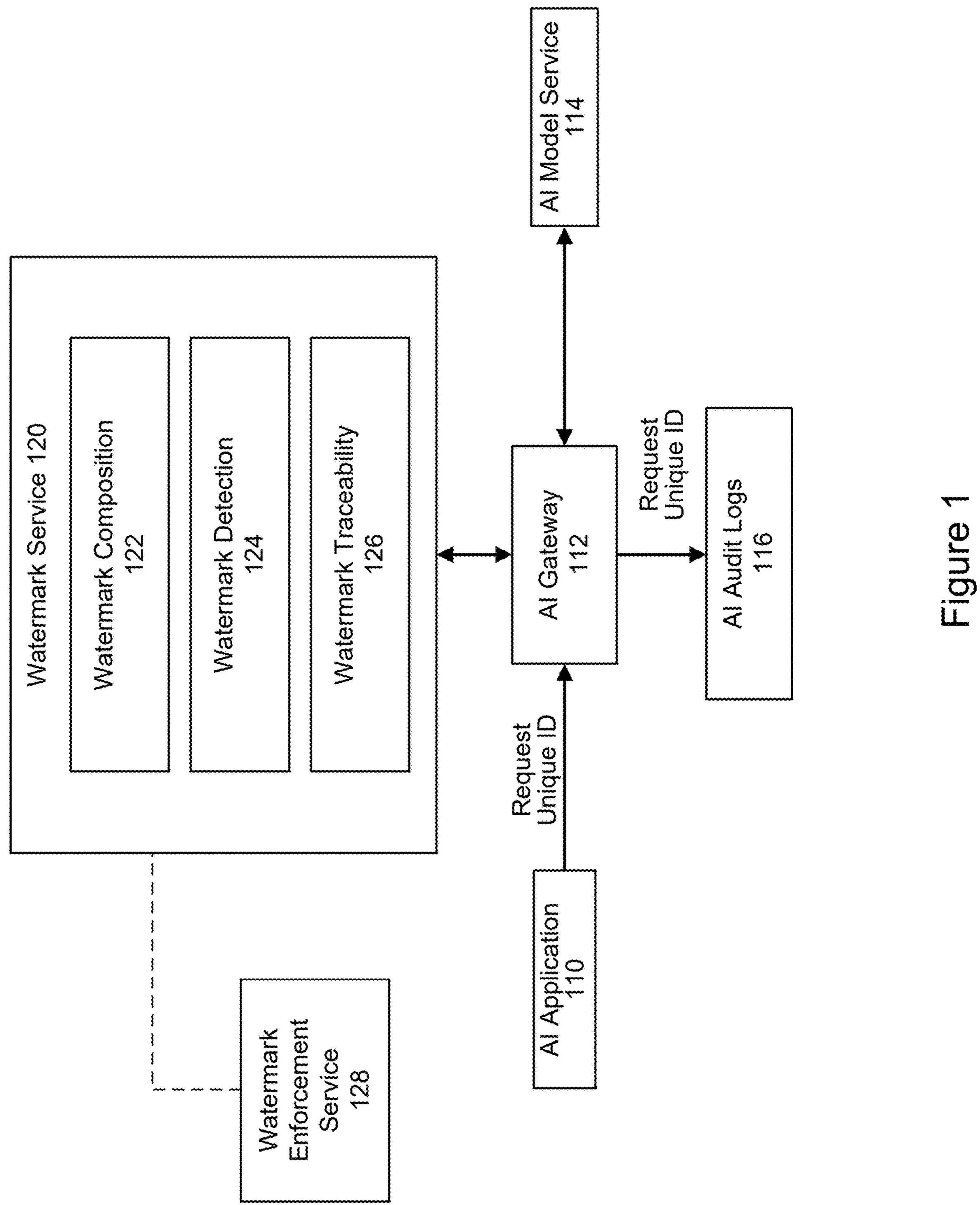
FIG. 1 is an exemplary system diagram, according to an embodiment of the present invention.

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to a method and system for embedding a unique invisible watermark into a text output of a large language model to enable traceability and verification of content without perceptibly altering the text, modifying the base LLM, or impacting the computational efficiency of text generation.

Within an enterprise embodiment of the present invention, calls to an LLM may be sent via an intermediary, such as an AI Gateway. According to an embodiment of the present invention, the innovative watermark service may be implemented in the AI Gateway as a service and part of its architecture. The AI Gateway is one example of an intermediary. Other intermediaries and variations thereof may be implemented in accordance with an embodiment of the present invention.

With an embodiment of the present invention, each request made to an LLM or LLM provider, through an AI Gateway, may be attached to a unique identifier ("UID"). The UID may be encoded in binary using a predetermined set of invisible and Unicode characters. The identifier may be wrapped by another distinct invisible Unicode to delineate where the watermark is positioned. The UID enables direct traceability and may be correlated with various metrics and attributes, e.g., who made the call to the LLM, when the call was made, query details, model details and other metrics that may be configured or defined in the intermediary or AI Gateway.

After the text is generated by the LLM, the watermark may be inserted according to a specific format, e.g., at the end of every line of the response, specific locations in the output. Based on the type of output or other characteristics, different formats or placements may be applied. This post generation watermarking and placement strategy enhances the robustness of the watermark.

Prior to subsequent processing or re-input into the LLM, the watermark may be removed from the text to prevent any interference with the AI model's operations and to conserve computational resources. The process of embedding and removing the watermark may be designed to be computationally minimal, ensuring negligible impact on the runtime and token usage of the LLM.

An embodiment of the present invention is directed to a verification system that detects the presence of the watermark in any text generated by the LLM. The verification functionality may be integrated as an endpoint in applications, allowing for a check of text for watermarks. Other implementations may be supported.

According to an embodiment of the present invention, the watermark may be non-intrusively applied to the LLM output without modifications to a Generative Artificial Intelligence (GAI) application or other AI application. The watermark may persist through various downstream applications, so audit teams may decode/detect the watermark during any point in traversal. The watermark may include a UID that may be used for traceability allowing for correlation with particular requests, auditing, etc. The audit provides visibility into the origin of the request, related information, why it was generated, etc. With the innovative watermark platform, there is minimal to no visual impact and minimal to no impact on the text generation performance or quality. In addition, there is little to no cost and little to no barrier to entry.

According to an embodiment of the present invention, the system may include an API that handles the insertion and removal of watermarks as part of the workflow in generating and processing LLM outputs. This API may interact with the LLM to receive raw text outputs, process the outputs to embed watermarks, and subsequently remove the watermarks when the text is re-inputted into the LLM or other model.

An embodiment of the present invention recognizes that there is a need to trace and verify the origin of such content in a streamlined and efficient manner. This is particularly relevant with the increasing utilization of LLMs in generating textual content that may be appear indistinguishable from human-created text.

As the number of applications using Generative Artificial Intelligence (GenAI) models increases, an embodiment of the present invention is directed to providing a consistent mechanism to access different models as well as apply and monitor policies and controls.

An embodiment of the present invention provides efficient traceability with minimal overhead and does not rely on specific methods or changes/modifications to AI models.

An embodiment of the present invention is directed to a platform for an enterprise that supports a unique combination of components including: model provider, watermark service, tracing/auditing downstream application output.

FIG. 1 is an exemplary illustration of a system architecture and operation, according to an embodiment of the present invention. AI Application 110 may send a request to AI Model Service 114 through AI Gateway 112 that serves as an intermediary. AI Gateway 112 may interact with Watermark Service 120 to generate, insert and verify watermarks for LLM and other AI model outputs from AI Model Service 114.

AI Application 110 may represent an application that generates content that an entity may want to trace. The content may represent proprietary information, intellectual property content, sensitive data and other information. AI Application 110 may support various types of inputs, including text, audio, video, streaming data, etc.

As shown in FIG. 1, as AI Application 110 sends a request to AI Model Service 114, AI application 110 may request a unique identifier through AI Gateway 112. AI Gateway 112 may invoke a watermark service through Watermark Service 120 to request a unique identifier. Watermark Service 120 may include Watermark Composition 122, Watermark Detection 124 and Watermark Traceability 126. Watermark Composition 122 may generate a unique identifier that may then be used to generate a watermark for the specific AI application request.

AI Gateway 112 may interact with AI Model Service 114 and then add (e.g., append, embed, insert, etc.) the output with the watermark that includes the unique identifier. FIG. 1 illustrates a watermark service with detection services through Water Detection 124 and traceability services through Watermark Traceability 126 and AI Audit Logs 116.

Similar to API Gateways that act as a reverse proxy to control traffic coming in from the internet, AI Gateway 112 may represent a proxy to control and monitor the API calls routed to AI models, as shown by 114, hosted on SaaS providers or on cloud service providers. For example, the AI Gateway may act as a control plane for AI API traffic. Within or associated with AI Gateway 112, Watermark Service 120 may be applied to various use cases where traceability would be paramount and desirable. The AI Gateway may represent a broker or intermediary between LLMs and users to properly monitor and audit information.

Watermark Service 120 may include an API that handles the insertion and removal of watermarks as part of the workflow in generating and processing AI model outputs. This API may interact with the AI Model 114 to receive raw text outputs, process them to embed watermarks, and subsequently remove watermarks when the text is re-input into the AI model.

Watermark Service 120 may integrate with an intermediary such as AI Gateway 112. The watermarking mechanism may be embedded within AI Gateway 112 as a service, being a distinct component of its architecture. AI Gateway 112 may serve as a proxy to control and monitor API calls to AI models hosted on SaaS or cloud services.

Watermark Composition 122 may generate unique identifiers that may be used in watermarks. Watermark Composition 122 may also insert and remove the watermark.

Each request made through AI Gateway 112 may be tagged with a unique identifier (UID), encoded in binary using predetermined invisible and rarely used Unicode characters. The UID may ensure direct traceability correlated with various metrics such as the caller, time, query, model used, etc.

An embodiment of the present invention may use two (or more) different characters for the "0 bits" and "1 bits." This identifier may be wrapped by another distinct invisible Unicode to delineate where the watermark is and further ensure invisibility and non-obtrusiveness in the text. The UID may enable an ability to perform direct traceability as it may be searched, and may be further correlated with who called the LLM, when, the query, what model, and any other related metrics that may be defined in AI Gateway 112, e.g., token usage, cost consumption, etc.

At post-generation of text by the LLM, an embodiment of the present invention may insert the watermark according to a placement strategy or format, e.g., at the end of every line of the response. The placement strategy may enhance the robustness of the watermark, making it difficult to remove without detailed, line-by-line modification of the text. The placement strategy may further ensure that there is at least one instance of the watermark per generated text while not affecting the appearance of the text.

Prior to any subsequent processing or re-input into the LLM, the watermark may be detected and removed from the text to prevent any interference with the model's operations and to conserve computational resources.

At post-text generation by the LLM, the watermark may be inserted at the end of each response line and removed before re-inputting into the LLM to conserve resources and prevent operational interference.

According to an embodiment of the present invention, the watermarking process may be computationally minimal, essentially guaranteeing negligible impact on runtime and token usage. The watermark may be non-intrusively applied to the LLM output without modifications to the GAI application and may persists through various downstream applications. Audit teams may decode/detect the watermark during any point in traversal.

Watermark Detection 124 may determine whether a watermark (or unique identifier) is detected in an input or other request. An embodiment of the present invention may include a stand-alone watermark detection API, as shown by 124, that may be used by different applications as part of a larger workflow to check for the presence of a watermark and determine if the content is AI Generated.

Watermark Traceability 126 provides an ability to audit content including internal as well as external usage. In addition, Watermark Traceability 126 may provide lineage information including who made the request, what was the original request, when was the request made, etc. Watermark Traceability 126 may further interact with audit logs as well as other components including databases, storage devices, external systems, etc.

An embodiment of the present invention provides a way to protect and monitor an entity's intellectual property and other proprietary data. For example, an entity may provide generated content that may be shared and otherwise used by various vendors and external partners. An embodiment of the present invention provides a way to trace, monitor and verify the generated content. For example, an embodiment of the present invention may identify how a content was used in downstream applications and systems.

The watermark may include an ID used for traceability allowing for correlation with a specific request. For auditing purposes, the watermark may allow for tracing of the origin of the request, information, why it was generated, etc. There is no visual impact, and no impact on the text generation performance or quality. In addition, there is little to no cost and little to no barrier to entry as it is already integrated into the centralized LLM service for an entity or enterprise.

Through Watermark Composition 122, an embodiment of the present invention may provide enhancements to UID encoding. Beyond the current encoding of request IDs, an embodiment of the present invention may expand information that is encoded where iterations of the UID may incorporate additional metadata. This may include various types of information, such as type of content generated (e.g., summary, analysis, recommendation, etc.), an intended application of the content, specific disclaimers related to the use of AI-generated material, etc. This provides a richer and more robust dataset for auditing and compliance purposes.

An embodiment of the present invention may provide disclaimer integration. This may be provided by Watermark Composition 122. For example, UIDs may be expanded to include specific disclaimers, alerting users and downstream systems about the AI-generated nature of the content and various legal and other considerations attached to its use. Including such disclaimers promotes transparency and ensures that stakeholders are aware of the content's origin.

An embodiment of the present invention is directed to a Watermark Enforcement Service, as shown by 128. An exemplary implementation may include a Client-Side Enforcement. In this example, a proposed client-side library, referred to as the Watermark Enforcement Service, may empower applications to actively check for the presence of a watermark upon content arrival. This service may be configurable to trigger specific actions based on watermark detection.

For example, Watermark Enforcement Service 128 may provide actionable measures. Depending on the application's configuration, the service may automatically display disclaimers, restrict actions such as copy-and-paste, and/or notify the user of the AI-generated status of the content. This may enhance security and maintain the integrity of content usage.

In addition, Watermark Enforcement Service 128 may provide integration and flexibility. Applications that integrate the client-side library may have the flexibility to customize enforcement rules, thereby maintaining control over how AI-generated content is handled and maintaining alignment with organizational policies.

Figure 2:
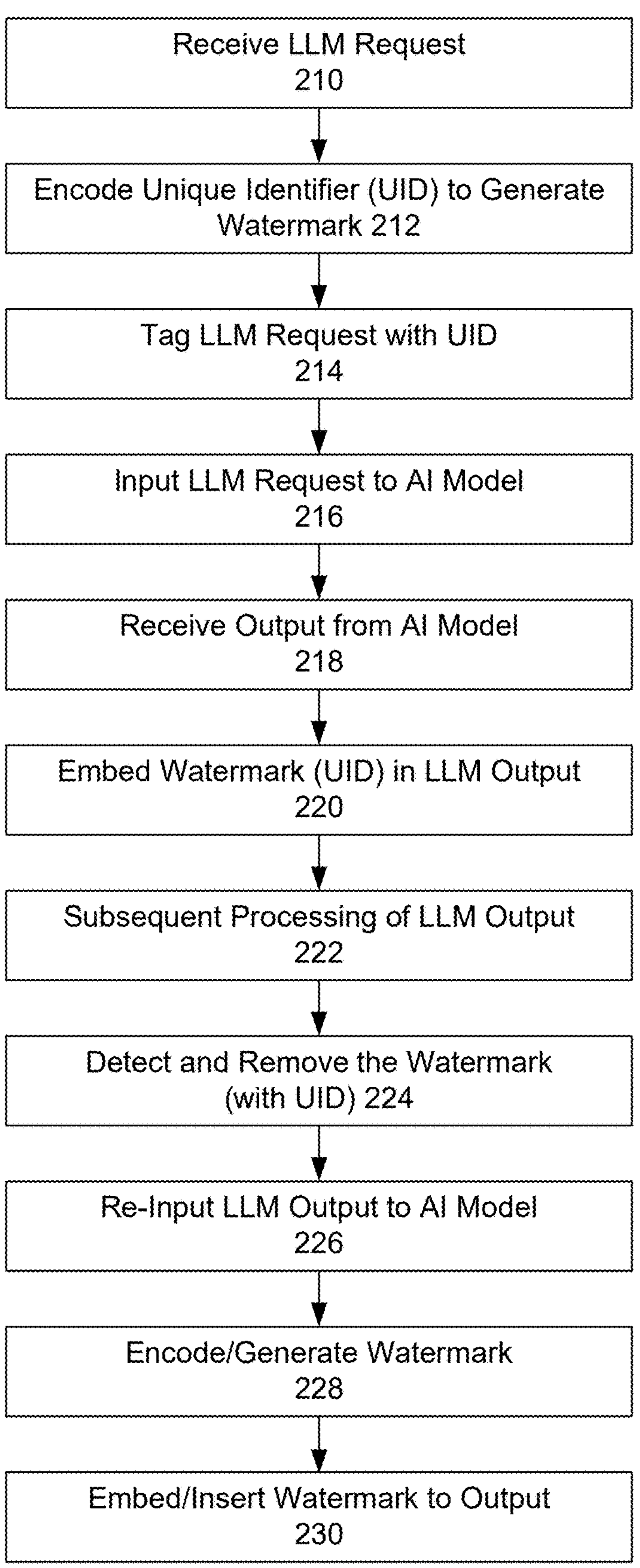
FIG. 2 is an exemplary flowchart, according to an embodiment of the present invention.

FIG. 2 is an exemplary flowchart, according to an embodiment of the present invention. At step 210, a LLM request may be received. At step 212, a unique identifier may be encoded to generate a watermark. At step 214, the LLM request may be tagged with the unique identifier. At step 216, the LLM request may be inputted to an AI model. At step 218, an output may be received from the AI model. At step 220, the output may be processed to embed the watermark. At step 222, subsequent processing may involve re-inputting the LLM output. At step 224, the unique identifier (watermark) may be detected and removed. At step 226, the LLM output may be re-inputted to the AI model. At step 228, a watermark may be encoded or generated. At step 230, the watermark may be embedded or otherwise inserted to the output. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details may be provided.

At step 210, a LLM request may be received. The LLM request may be from an application that an entity would want to trace. The application may generate content including proprietary information, intellectual property and/or other content that is associated with an entity.

At step 212, a unique identifier may be encoded to generate a watermark. For example, the unique identifier may be encoded in binary using a set of invisible and Unicode characters. In addition, the identifier may be wrapped by another Unicode. Other variations and types of encoding processes may be supported.

At step 214, the LLM request may be tagged with the unique identifier associated with the watermark. This step may be optional.

At step 216, the LLM request may be input to an AI model. The AI model may include various types of LLM and other AI/ML models and systems.

At step 218, an output may be received from the AI model. The output may include raw text outputs from the AI model.

At step 220, the output may be processed to embed the watermark that includes the unique identifier. The watermark may be added to the output according to a specific format, e.g., insert at the end of every line in a response. The unique identifier may be injected in a non-intrusive manner.

At step 222, subsequent processing may involve re-inputting the LLM output.

At step 224, the unique identifier (watermark) may be detected and removed.

At step 226, the LLM output may be re-inputted to the AI model. The AI model may represent the same or different AI model.

At step 228, a watermark may be encoded or generated. The generated watermark may refer back to the prior watermark and other lineage data.

At step 230, the watermark may be embedded or otherwise inserted to the output. The watermarked response may be transmitted or displayed on a user interface.

Figure 3:
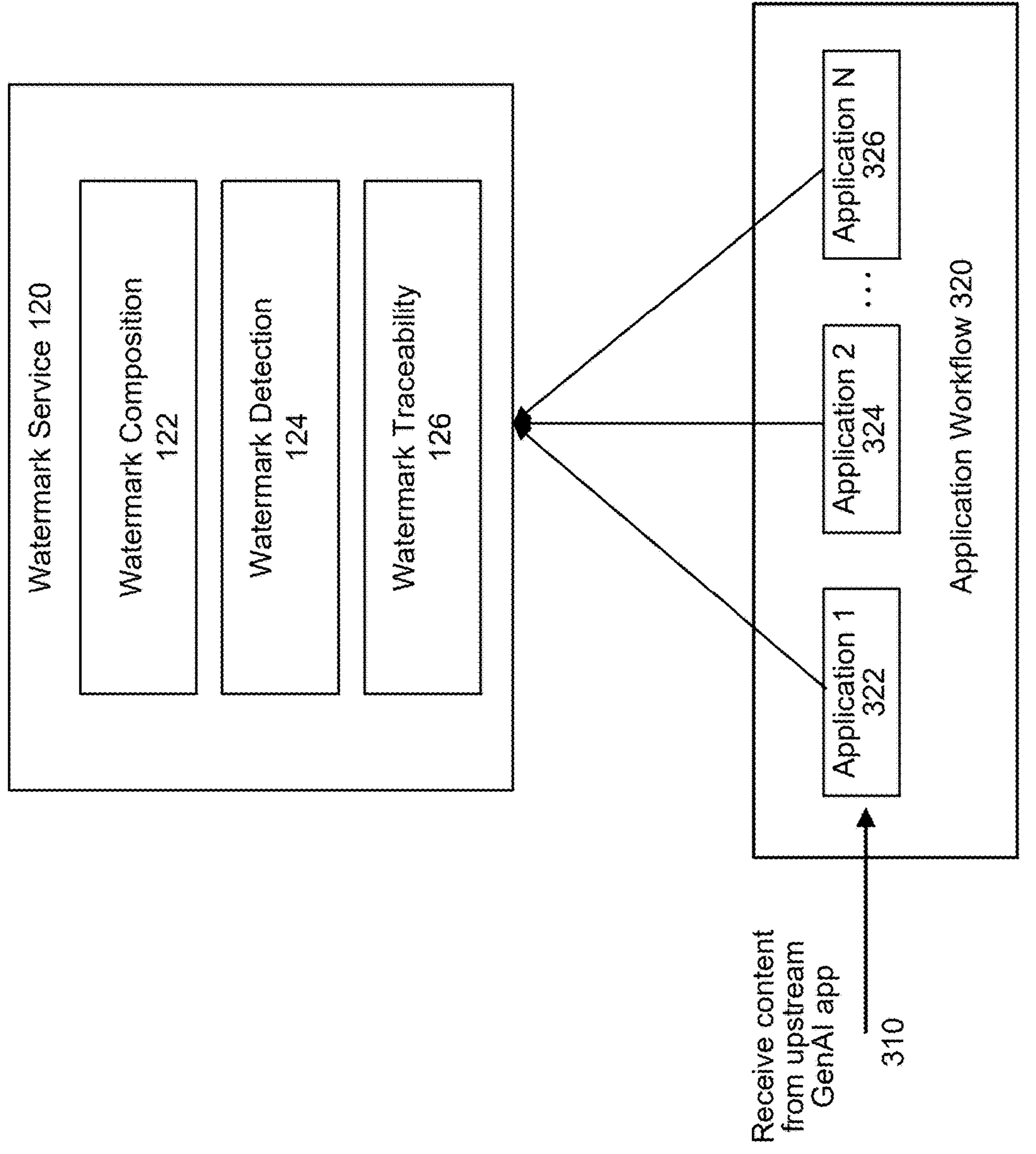
FIG. 3 is an exemplary system diagram, according to an embodiment of the present invention.

FIG. 3 is an exemplary system diagram, according to an embodiment of the present invention. FIG. 3 illustrates an application workflow that invokes a watermark detection and traceability service. As shown by FIG. 3, content from an upstream GenAI application may be received at 310. Application Workflow 320 may include Application 1 322, Application 2 324 and other applications represented by Application N 326. The applications may invoke a watermark detection to determine whether the content is LLM generated. Lineage and other trace information may be provided by Watermark Traceability 126. This may be provided through audit logs, etc.

An embodiment of the present invention may be directed to a verification system that detects watermark presence, as shown by Watermark Detection 124, in any text generated from an AI Gateway (or other intermediary or service) and further decodes the UID to confirm content authenticity and origin.

The verification system may reverse-engineer the watermarking process to extract and decode the unique identifier, thereby confirming the authenticity and origin of the content. The verification system may be integrated as an endpoint in various applications to facilitate and streamline watermark checking. Other various implementations may be supported.

An embodiment of the present invention may be integrated with a Software Development Life Cycle (SDLC) process. SDLC provides a framework for software development that ensures a systematic approach to building and maintaining software applications. An embodiment of the present invention may provide a watermark detection check that enforces a check for a watermark in certain applications. This may promote an automated enforcement in certain applications with AI generated content. For example, certain applications may rely on or generate sensitive content that may require controls. The controls may include: restrictions (e.g., disable copy and paste, inability to forward, etc.); disclaimers, attestations from an end user or other recipients, subsequent controls, etc. The controls may be application specific, entity-mandated. Other controls may relate to regulations, compliance, rules, etc.

Figure 4:
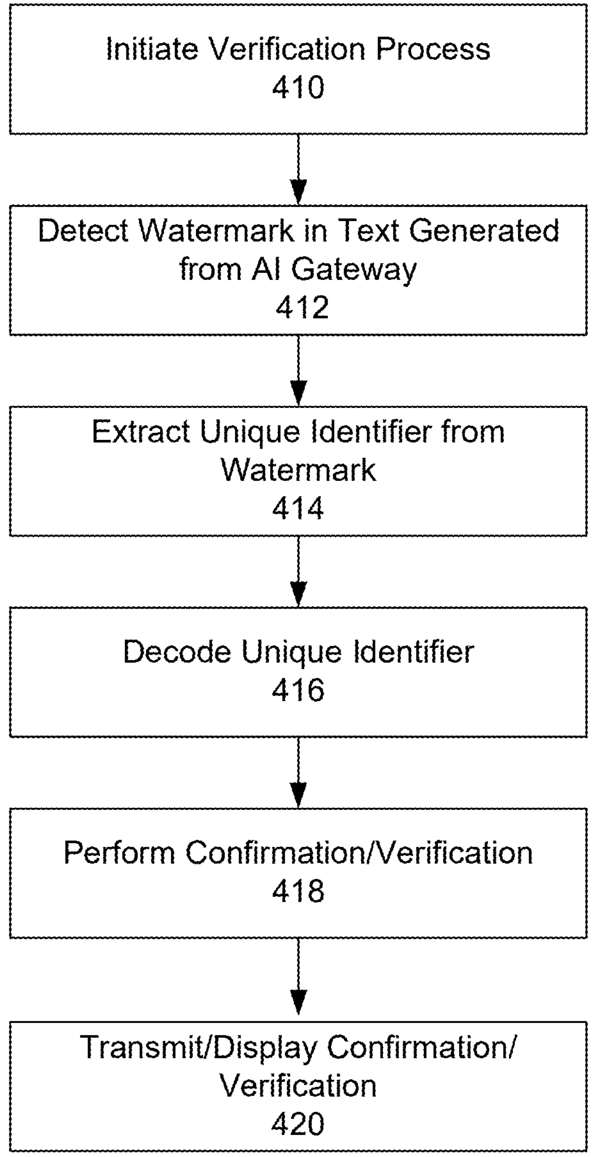
FIG. 4 is an exemplary flowchart, according to an embodiment of the present invention.

FIG. 4 is an exemplary flowchart, according to an embodiment of the present invention. At step 410, a verification process may be initiated. At step 412, a watermark may be detected in text generated from an AI Gateway. At step 414, an embodiment of the present invention may apply reverse engineering to extract a unique identifier associated with the watermark. At step 416, the unique identifier may be decoded to confirm content authenticity and origin. At step 418, a confirmation may be generated. At step 420, the confirmation may be transmitted or displayed. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Additional details may be provided.

An embodiment of the present invention is directed to UID management. For certain applications that require the watermark, an embodiment of the present invention may enforce watermark detection as appropriate. An embodiment of the present invention may utilize custom rules in a platform for continuous inspection of code quality, code review tools or code quality jobs to enforce detection or usage as necessary. For example, custom rules in code review jobs may be applied as part of a continuous integration (CI)/continuous development (CD) process. An embodiment of the present invention may enforce detection or usage as necessary, during development of applications in which traceability may be considered important.

An embodiment of the present invention may be LLM agnostic and adaptable to switch between various models (e.g., Open AI, or other AI model providers), as it sits outside the model inference layer and may be a separate part of AI Gateway services. The watermark may be removed before sending content for inference and may be added only after inference is complete. Other implementations may be supported.

According to an embodiment of the present invention, because the watermark is virtually invisible, it is difficult to tamper with and detect. For various applications (e.g., Office applications, Outlook, Teams, Word, etc., or other formats, like HTML/web browser rendering, or PDF), an embodiment of the present invention ensures minimal or no impact on formatting with the watermark in the content. In fact, the watermark would only show up in Code Integrated Development Environments (IDEs) where hidden characters are shown, while more commonly used applications (e.g., personal information manager software system, cloud-based platform for collaboration and communication), where usage is monitored, would not show the watermark. An embodiment of the present invention seeks to allow the ability to monitor as necessary.

Figure 5:
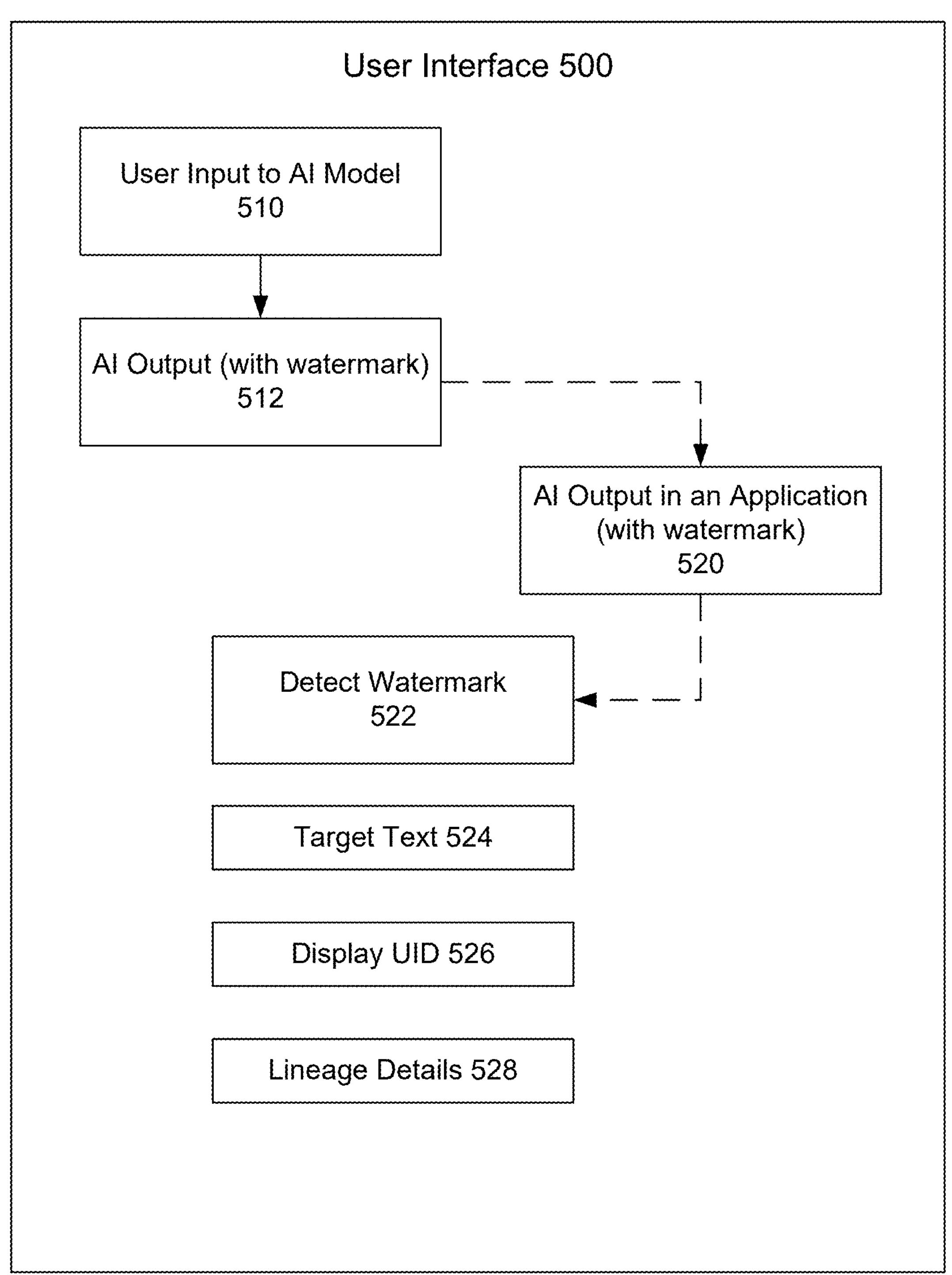
FIG. 5 is an exemplary user interface, according to an embodiment of the present invention.

FIG. 5 is an exemplary user interface, according to an embodiment of the present invention. User Interface 500 may represent a single interface or a series of interfaces across multiple systems, devices, platforms, environments, etc.

FIG. 5 is an example of an interactive user interface that receives a user request at 510. In this example, user input to an AI model, as shown by 510, may include: "write an email to my manager explaining what a LLM is." An AI output may be provided in response at 512. The AI output may represent an email text that includes a non-intrusive invisible watermark added at each line of the email text.

In a separate interaction, the user may then copy the email text and paste it to an application such as an email communication system, as shown by 520. The text will include the non-intrusive invisible watermark added at each line of the email text. While a single application is shown at 520, additional applications across multiple systems may be supported.

In another interaction, the user may want to detect whether the email text is AI generated, at 522. The user may provide a target text at 524 and initiate a decode/detection action. In this example, the target text may include the email text from the application at 520. The interface may display a hidden UID in the identified message at 526 and also include lineage details at 528. Lineage details may include: original request; model; requesting application; timestamp as well as other data, metrics, etc.

The User Interface of FIG. 5 may interface and communicate with various users via a communication network. Other users, interactions and integrations may be supported.

The system components are exemplary and illustrative, an embodiment of the present invention may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The illustrated system may be communicatively coupled to various Data Stores as well as remote storages. Data stores may also store and maintain source code, reports, performance data, historical data, etc. These storage components may include any suitable data structure to maintain the information and allow access and retrieval of the information. The storage may be local, remote, or a combination. The storage components may have back-up capability built-in. Communications with the storage components may be over a network or communications may involve a direct connection between the various storage components. The storage components may also represent cloud or other network based storage.

The system may be implemented in a variety of ways. Architecture within the system may be implemented as hardware components (e.g., module) within one or more network elements. It should also be appreciated that architecture within the system may be implemented in computer executable software (e.g., on a tangible, non-transitory computer-readable medium) located within one or more network elements. Module functionality of architecture within the system may be located on a single device or distributed across a plurality of devices including one or more centralized servers and one or more mobile units or end user devices. The architecture depicted in the system is meant to be exemplary and non-limiting. For example, while connections and relationships between the elements of system are depicted, it should be appreciated that other connections and relationships are possible. The system described may be used to implement the various methods herein, by way of example. Various elements of the system may be referenced in explaining the exemplary methods described herein.

Networks may be a wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although Networks may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via Networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the figures illustrate individual devices or components, it should be appreciated that there may be several of such devices to carry out the various exemplary embodiments. The system may communicate using any mobile or computing device, such as a laptop computer, a personal digital assistant, a smartphone, a smartwatch, smart glasses, other wearables or other computing devices capable of sending or receiving network signals. Computing devices may have an application installed that is associated with the illustrated system.

Those skilled in the art will appreciate that the diagrams discussed above are merely examples of a system and a method for implementing a watermark service platform. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, IOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A system for watermarking large language model outputs comprising:

a computer server comprising one or more processors;

an intermediary that is in communication with a watermarking service; and non-transitory memory comprising instructions that, when executed by the one or more processors, cause the one or more processors to:

receive, at the intermediary, a large language model (LLM) request from an application to a model service;

encode, at the watermarking service, a unique identifier to generate a watermark that uniquely identifies the large language model request, wherein the unique identifier is encoded using invisible Unicode characters and wherein the unique identifier is wrapped by a distinct invisible Unicode character to delineate where the watermark is positioned;

input, at the model service, the large language model request;

receive, from the model service, a text output responsive to the large language model request; and embed the watermark in the text output according to a format, wherein the watermark is traceable and verifiable through the watermarking service.

2. The system of claim 1, wherein the one or more processors are further caused to:

determine a subsequent processing of the text output;

detect, at the watermarking service, the watermark from the text output;

remove, at the watermarking service, the watermark from the text output;

re-input the text output to a second model service;

generate a subsequent watermark for the text output of the second model service, and embed the subsequent watermark to an output of the second model service wherein the subsequent watermark is traceable and verifiable.

3. The system of claim 1, wherein the intermediary is an AI Gateway.

4. The system of claim 1, wherein the unique identifier is associated with a set of metrics associated with the LLM request.

5. The system of claim 4, wherein the set of metrics comprises: who initiated the LLM request, when the LLM request was initiated, what application initiated the LLM request.

6. The system of claim 1, wherein the format comprises inserting at least a portion of the watermark at multiple portions of the text output.

7. The system of claim 1, wherein the format comprises inserting at least a portion of the watermark at each line of the text output.

8. The system of claim 1, wherein the text output can be verified through a verification service that determines whether the text output is AI generated.

9. The system of claim 1, wherein the unique identifier is associated with an audit log.

10. A computer-implemented method comprising the steps of:

receiving, at an intermediary, a large language model (LLM) request from an application to a model service, wherein the intermediary is in communication with a watermarking service;

encoding, at the watermarking service, a unique identifier to generate a watermark that uniquely identifies the large language model request, wherein the unique identifier is encoded using invisible Unicode characters and wherein the unique identifier is wrapped by a distinct invisible Unicode character to delineate where the watermark is positioned;

inputting, at the model service, the large language model request;

receiving, from the model service, a text output responsive to the large language model request; and embedding the watermark in the text output according to a format, wherein the watermark is traceable and verifiable through the watermarking service.

11. The method of claim 10, further comprising the steps of:

determining a subsequent processing of the text output;

detecting, at the watermarking service, the watermark from the text output;

removing, at the watermarking service, the watermark from the text output;

re-inputting the text output to a second model service;

generating a subsequent watermark for the text output of the second model service, and embedding the subsequent watermark to an output of the second model service wherein the subsequent watermark is traceable and verifiable.

12. The method of claim 10, wherein the intermediary is an AI Gateway.

13. The method of claim 10, wherein the unique identifier is associated with a set of metrics associated with the LLM request.

14. The method of claim 13, wherein the set of metrics comprises: who initiated the LLM request, when the LLM request was initiated, what application initiated the LLM request.

15. The method of claim 10, wherein the format comprises inserting at least a portion of the watermark at multiple portions of the text output.

16. The method of claim 10, wherein the format comprises inserting at least a portion of the watermark at each line of the text output.

17. The method of claim 10, wherein the text output can be verified through a verification service that determines whether the text output is AI generated.

18. The method of claim 10, wherein the unique identifier is associated with an audit log.

* * * * *